Figure 1:
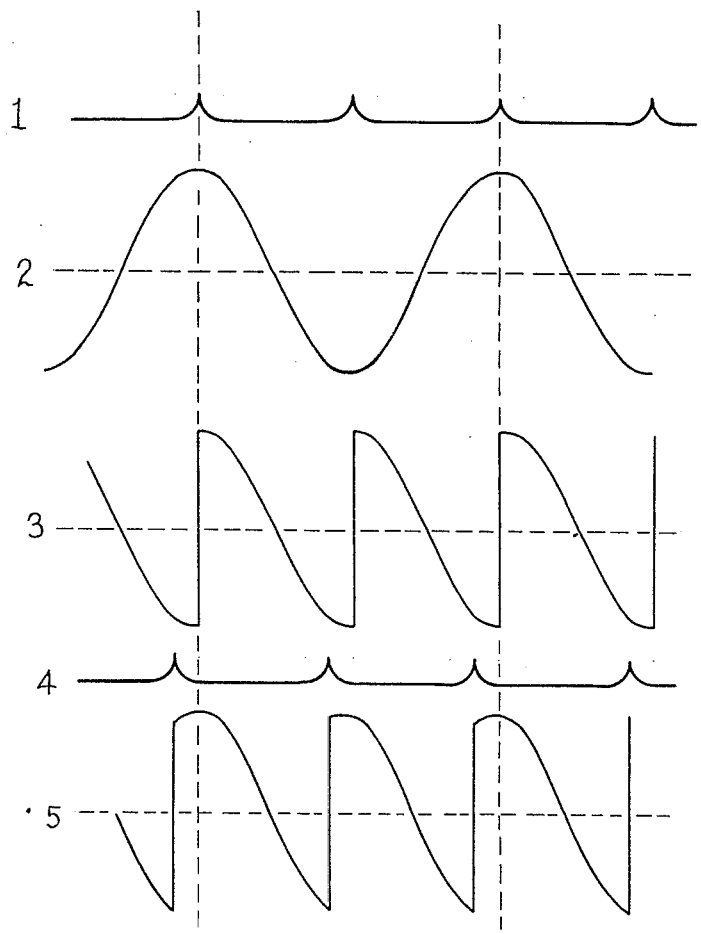

INVENTORS
Arnold Schönung
Kurt Stahl
BY
Pierce, Scheffler & Parker
Attorneys.

United States Patent Office

3,167,702
Patented Jan. 26, 1965

3,167,702
VIBRATION DAMPING ARRANGEMENT FOR ROTARY FIELD SYSTEM OF EXCITATION REGULATION SYNCHRONOUS MACHINES
Arnold Schönung, Lindenberg, Pfalz, and Kurt Stahl, Brunnengasse, Germany, assignors to Brown, Boveri & Cie, Aktiengesellschaft, Mannheim, Germany, a joint-stock company
Filed Aug. 14, 1961, Ser. No. 131,289
Claims priority, application Germany Aug. 18, 1960
5 Claims. (Cl. 322—17)

The present invention relates to an improved arrangement for damping oscillations in the rotary field element of synchronous electrical machines and in particular to an arrangement which eliminates the necessity for utilizing special damping windings which has long been conventional practice.

The rotary field of synchronous machines, such as synchronous generators, synchronous motors and phase shifters, operates at a certain load angle for a given excitation and given effective power output or input. If, as a result of a change in excitation, a change in the effective power delivered or absorbed, or a change in the position of the network vector, there is a change in the load angle required, then the rotary field assumes its new position generally in the form of a periodically damped vibration. The damping of this vibration is customarily achieved in that a damper winding is built into the machine, in which are induced currents that in turn produce an angular moment, which is directed counter to the given direction of movement of the load angle.

A sufficient damping of this vibration is indispensible in all those cases in which oscillations of the rotary field are induced by the above described changes, under some circumstances with a rhythm which coincides with the specific frequency of the oscillations. This is the case, for example, in synchronous motors which can be put under load intermittently, furthermore, in synchronous machines which are to hold the potential in a network that is loaded with blind load surges, or also in synchronous machines which operate on a network whose network vector can change through effective load surges. But in other synchronous machines too, as for example, synchronous generators in power plants, a sufficient damping of the rotary field oscillations is indispensible to cooperation in a flawless manner with other generators, and for a safe operation in case of sudden load changes, for example, as a result of a switch-off. In all these cases, a special damping winding formerly had to be provided in the machine, or a sufficient damping had to be provided for through other measures of machine construction.

In the device according to the invention a damping winding for damping the rotary field oscillations of synchronous machines is not necessary. Thus, it cannot happen that the damping winding under some circumstances acts counter to a very rapid excitation of the synchronous machine, and that this effect must be offset by a brief increase in the field current. With this is, however, also saved an increased expenditure required for this compensation at the exciting device as, for example, in the rectifier excitation.

The invention provides in synchronous machines, preferably regulated in their excitation through rectifiers, instead of the damping winding, that to the regulator is supplied a nominal value intended for an actual regulation, in dependence on the network potential or blind power output, and in addition a further nominal value obtained by means of a preferably electronic, for example, transistor multiplier, which agrees in its sign with the sign of the product of load angle and the first derivative of the load angle. There results in this manner, compared to the static moment, a supplemental moment which, in each case, is directed counter to the instantaneous change direction of the load angle. If the load angle lags and the first derivative of the load angle shows the tendency of increasing the same, then the excitation is increased. If with lagging load angle the first derivative of the latter shows the tendency to reduce the same, then the excitation is also reduced. The same applies analogously with advancing load angle. According to the invention, the regulation satisfies the equation:

$$\text{sign } \Delta I_e = \text{sign } \vartheta \cdot \dot{\vartheta}$$

Here $I_e$ is the exciting current and $\vartheta$ the load angle. The formula states that at oscillations in the vicinity of, or equal to zero, the excitation of the synchronous machine is to be damped with twice the frequency of its specific vibrations. Synchronous machines are today often provided with fast-acting exciter devices at any rate, for other reasons, for example, in order to be able to regulate out blind power surges quickly, or in order to increase the static stability in operation on a long line. These exciter devices are generally able to change the excitation in the necessary rhythm directly. If these prerequisites are fulfilled, it is possible according to the invention to do entirely or partly without a damping winding or other damping measures in the machine, and these can be replaced by the regulation of the excitation according to the invention.

In a continuation of the inventive idea it is further provided that the nominal value determined by means of the multiplier is proportional, in amount to the first derivative of the load angle. On the other hand it proves to be particularly advantageous in many cases to make the nominal value determined by means of the multiplier proportional in amount to the product of the load angle and of the first derivative of the load angle. Here, the effect of the damping increases steadily with increasing load angle.

The degree of damping of the rotary field oscillations attains an optimum value when, according to the invention, the nominal value determined by means of the multiplier is a square-wave voltage.

For the measurement of the load angle itself there serves, according to the invention, an instrument which measures the difference in potential between an alternating voltage which agrees in phase position with the network voltage and another alternating voltage of the same amplitude which agrees in phase position with the rotary field, and rectifies and smooths the potential difference obtained. With this one arrives at a particularly advantageous embodiment of the rotary field measuring instrument, if one reverses an alternating voltage of equal phase with the network, for example, by means of a transistor circuit, in the rhythm of impulses which are generated by an impulse producer that is controlled by the wave of the synchronous machine and gives off impulses with twice the rotational frequency of the rotary field, and if one supplies the reversed alternating voltage to the multiplier that serves as the nominal value producer, through a low-pass filter which forms average values.

Figure 2:
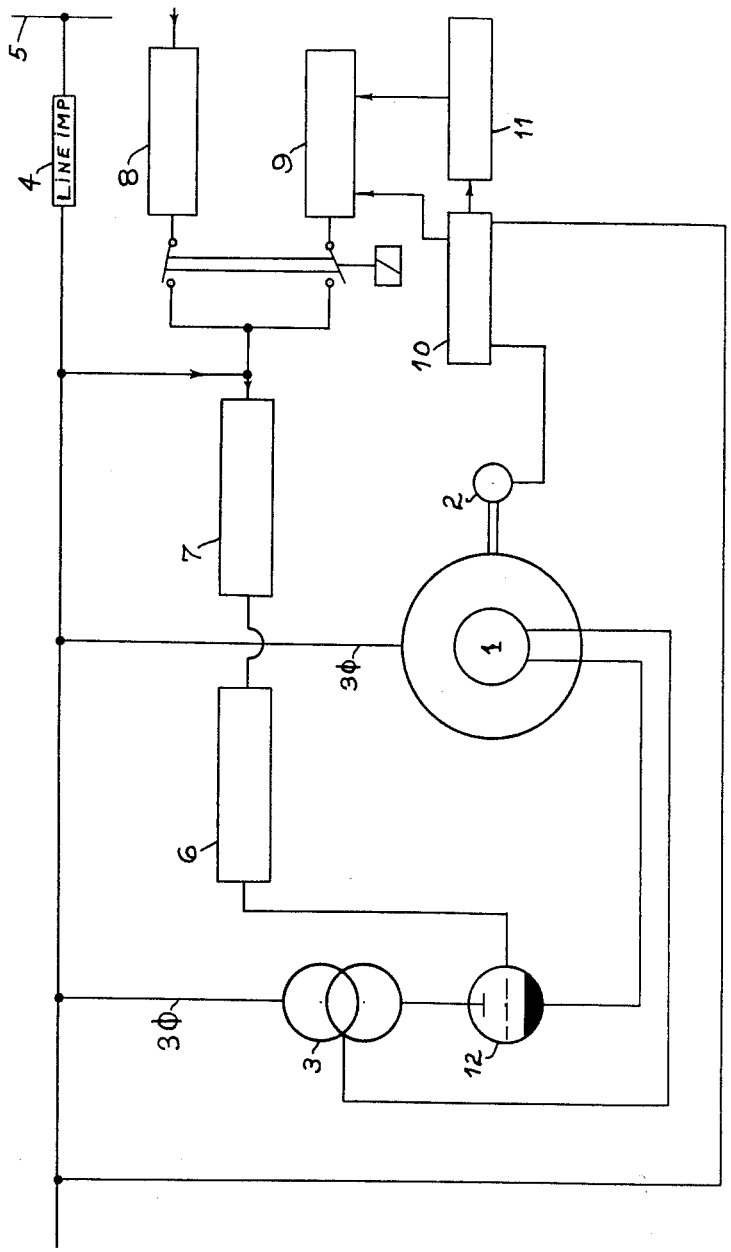

The invention will be more clearly understood from the following desciption of a preferred embodiment thereof and from the accompanying drawings wherein:

FIG. 1 is a family of curves relative to operation of the improved rotary field oscillation damping apparatus; and FIG. 2 is an electrical schematic view of the improved damping apparatus.

With reference to FIG. 1, the impulse producer delivers impulses (curve 1) which at a zero load angle coincide with the maximum (or minimum) of the voltage (curve 2) of equal phase with the network. Through the mentioned reversal one obtains a voltage (curve 3) whose average value is zero. At a different position of the load angle there also results a different position of the impulses (curve 4) relative to the network voltage (curve 2). The average value of this voltage (curve 5) constitutes a measure of the load angle. As will be later explained, it is consequently led through a low-pass filter, which forms an average value, to a multiplier that serves as a nominal value producer. In addition it is transmitted, after passing through the low-pass filter, to a differentiating circuit of known construction, and led after this to the multiplier for the second time.

Since the damping of the rotary field oscillations is undertaken according to the invention merely by intervention in the regulation of the excitation, it can be engaged or disengaged with arbitrary changes. This intervention generally brings with it an interference in the actual regulating task, for example, the potential regulation or the blind power regulation. Accordingly, it proves to be expedient to undertake it only when there is a real need for it, for example, when the load angle exceeds a critical value. Accordingly, the intervention of the nominal value formed preferably by an electronic, for example, transistor multiplier, on the regulator is so controlled in dependence on the load angle that it takes place only when a certain limiting value of the load angle is exceeded.

The damping instrument according to the invention can, however, also be so operated that with the application to the regulator of the nominal value formed preferably by an electronic, for example, transistor multiplier, the first nominal value producer intended, for example, for an actual regulation, dependent on the network voltage or blind power output, is disengaged from the regulator.

In FIG. 2, the device according to the invention for damping the rotary field oscillations of synchronous machines is illustrated diagrammatically in a particularly advantageous embodiment. With reference now to FIG. 2, it will be seen that the synchronous machine 1 is connected through a bus bar system not characterized in greater detail, and a line impedance 4, to the fixed network 5. The rotary field receives its exciter current through a rectifier 12 connected through the transformer 3 to the bus bar. The regulation of the exciter current takes place through a preferably electronic regulator 7, which operates on a likewise electronic grid control unit 6 of the rectifier. The network voltage or blind power output taken at the bus bar serves as the regulating magnitude. Accordingly, the regulator 7 is charged with the network voltage or the blind, i.e. the reactive power output. 8 designates a nominal value producer for the actual regulation in dependence on the network voltage or reactive power. The nominal value advanced by the instrument 8 has an additional nominal value superimposed on it additively by the instrument 9. The nominal value producer 9 is an electronic, for example, transistor multiplier which forms the product of the load angle and its first derivative with correct sign and supplies a voltage proportional to this product to the regulator 7. By 10 is designated a load angle measuring instrument which is fed by the impulse producer 2. The impulse producer 2 itself is controlled by the wave of the synchronous machine 1 and supplies impulses which lie in phase with the rotary field voltage. At zero load angle, the impulse delivered per pole lies in phase with the maximum of the synchronous generator terminal voltage.

By means of a known transistor circuit, and forming part of the instrument 10, the alternating voltage led from the network to instrument 10 is so converted that at zero load angle, the average value of the alternating voltage likewise becomes zero. With this, the load angle measuring instrument 10, thanks to the incorporation of a suitable filter, delivers, at its output, a direct voltage which is a measure of the load angle. By connecting an amplifier behind the load angle measuring instrument it is possible to adjust the voltage per load angle unit at will. The output voltage supplied by the load angle measuring instrument is led both to the multiplier 9 and to an instrument 11, which forms the first derivative of the load angle, or of the voltage proportional to it. Thus, the output voltage of instrument 11 represents a measure of the load angle change per unit time.

A second amplifier, not reproduced in more detail in FIG. 2, which is to be connected behind the instrument 11, permits through the variation of its degree of amplification an arbitrary adjustment of the voltage proportional to the first derivative of the load angle. Through a third amplifier connected behind the multiplier 9 and likewise regulatable in its degree of amplification, it is possible to approximate the voltage supplied by the multiplier 9 to the nominal value of the voltage or reactive power output regulation advanced by the instrument 8.

Another possibility of additional regulation in the function of the product of the load angle and its first derivative consists in that this additional nominal value change is carried out in dependence on the product of the load angle and its derivative (or sign) not continuously, but that the output voltage of the instrument 9 is added to the fixed nominal value delivered by the instrument 8 only when a critical value of the load angle is reached.

The nominal value producer 8 can also be disengaged, if necessary. The excitation of the synchronous machine 1 can be delivered, instead of by a rectifier, also by an additional machine or by a magnetic amplifier. The output of the latter then is to be led to the regulator 7.

We claim:

1. In a synchronous electrical machine apparatus the combination comprising a stator element connected to a network and a rotary field system, means for exciting the windings on said rotary field system, regulating means having the output thereof connected to said exciting means for controlling the output of said exciting means, means producing and supplying to the input of said regulating means a first nominal input control value, and means producing and supplying to the input of said regulating means a second nominal input control value, said first and second nominal input values serving to control the output of said regulating means, said first nominal input control value being determined in accordance with a value of the network and said second nominal input control value being determined in accordance with the product of the load angle and a derivative thereof with respect to time, said load angle being proportional to the difference between an alternating voltage in phase with the voltage of the network and another alternating voltage in phase with the rotary field system.

2. Apparatus as defined in claim 1 wherein said second nominal input control value is a square wave voltage and which is rectified and smoothed.

3. Apparatus as defined in claim 1 wherein said means producing said second nominal input control value in accordance with the product of said load angle and a derivative thereof includes an impulse producer which produces impulses in phase with the voltage of the rotary field system, said impulses being at twice the frequency of the rotation of said rotary field system.

4. Apparatus as defined in claim 1 and which further includes means for applying said second nominal input control value to said regulating means only when said load angle exceeds a predetermined magnitude.

5. Apparatus as defined in claim 4 and which further includes means for disconnecting said first nominal control value from the input to said regulating means when said second nominal input control value is applied.

References Cited in the file of this patent

UNITED STATES PATENTS 2,979,652 Breedon et al. _____ Apr. 11, 1961